United States Patent
Li et al.

(10) Patent No.: US 9,398,027 B2
(45) Date of Patent: Jul. 19, 2016

(54) DATA DETECTING METHOD AND APPARATUS FOR FIREWALL

(71) Applicant: Huawei Technologies Co., Ltd., Shenzhen (CN)

(72) Inventors: Shiguang Li, Beijing (CN); Wu Jiang, Beijing (CN); Zhihui Xue, Shenzhen (CN); Linghong Ruan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 16 days.

(21) Appl. No.: 14/305,723

(22) Filed: Jun. 16, 2014

(65) Prior Publication Data

US 2014/0298466 A1    Oct. 2, 2014

Related U.S. Application Data

(63) Continuation of application No. PCT/CN2012/080569, filed on Aug. 24, 2012.

(30) Foreign Application Priority Data

Dec. 31, 2011  (CN) .......................... 2011 1 0459872
Feb. 27, 2012  (CN) .......................... 2012 1 0045928

(51) Int. Cl.
*H04L 29/00* (2006.01)
*H04L 29/06* (2006.01)
(Continued)

(52) U.S. Cl.
CPC .............. *H04L 63/14* (2013.01); *H04L 43/028* (2013.01); *H04L 63/0236* (2013.01); *H04L 63/1408* (2013.01); *H04L 41/082* (2013.01)

(58) Field of Classification Search
CPC . H04L 63/14; H04L 63/1408; H04L 63/0236; H04L 43/028; H04L 41/082
See application file for complete search history.

(56) References Cited

U.S. PATENT DOCUMENTS 8,112,800 B1 *    2/2012 Yang ..................... G06F 21/554
                                              726/22
2003/0145228 A1 *  7/2003 Suuronen .............. H04L 63/145
                                              726/12
(Continued)

FOREIGN PATENT DOCUMENTS

CN          101052046 A    10/2007
CN          101459660 A     6/2009
(Continued)

OTHER PUBLICATIONS

Partial English Translation and Abstract of Chinese Patent Application No. CN101547207A, Dec. 5, 2014, 18 pages.
(Continued)

*Primary Examiner* — Brandon Hoffman
*Assistant Examiner* — Helai Salehi
(74) *Attorney, Agent, or Firm* — Conley Rose, P.C.; Grant Rodolph (57) ABSTRACT

A data detecting method and apparatus for a firewall device connected with a network to identify security threat in the data, where the method is implemented by a fast forwarder in the firewall device and includes: the fast forwarder receives application data; obtains application information in the received application data; determines an application protocol type corresponding to the application data according to the application information and an application identifying table; queries a configuration item for threat detection according to the application protocol type to determine whether the application data requires threat detection; and if the application data does not require threat detection, forwarding the application data. The data detecting method avoids a problem that performance of a firewall is degraded because all application data is sent to a detecting processor in the firewall device for detection, thereby improving an performance of the firewall device.

19 Claims, 3 Drawing Sheets

(51) Int. Cl.
   *H04L 12/26* (2006.01)
   *H04L 12/24* (2006.01)

(56) References Cited

U.S. PATENT DOCUMENTS

| | | | |
|---|---|---|---|
| 2009/0158428 A1 | 6/2009 | Wang | |
| 2010/0235902 A1* | 9/2010 | Guo | H04L 1/1671 726/12 |
| 2013/0042323 A1 | 2/2013 | Narayanaswamy et al. | |

FOREIGN PATENT DOCUMENTS

| | | |
|---|---|---|
| CN | 101547207 A | 9/2009 |
| CN | 101599922 A | 12/2009 |
| CN | 101789905 A | 7/2010 |
| CN | 102075503 A | 5/2011 |
| CN | 102123076 A | 7/2011 |
| CN | 102594623 A | 7/2012 |

OTHER PUBLICATIONS

Foreign Communication From A Counterpart Application, Chinese Application No. 201210045928.2, Chinese Office Action dated Nov. 15, 2014, 5 pages.
Partial English Translation and Abstract of Chinese Patent Application No. CN101789905A, Part 1, Jul. 29, 2014, 12 pages.
Partial English Translation and Abstract of Chinese Patent Application No. CN101789905A, Part 2, Jul. 29, 2014, 3 pages.
Partial English Translation and Abstract of Chinese Patent Application No. CN101052046A, Part 1, Jun. 5, 2014, 4 pages.
Partial English Translation and Abstract of Chinese Patent Application No. CN101052046A, Part 2, Jul. 25, 2014, 3 pages.
Partial English Translation and Abstract of Chinese Patent Application No. CN101599922A, Part 1, Jul. 29, 2014, 5 pages.
Partial English Translation and Abstract of Chinese Patent Application No. CN101599922A, Part 2, Jul. 29, 2014, 2 pages.
Foreign Communication From A Counterpart Application, PCT Application No. PCT/CN2012/080569, English Translation of International Search Report dated Dec. 6, 2012, 2 pages.
Foreign Communication From A Counterpart Application, PCT Application No. PCT/CN2012/080569, English Translation of Written Opinion dated Dec. 6, 2012, 9 pages.

* cited by examiner

DATA DETECTING METHOD AND APPARATUS FOR FIREWALL

CROSS-REFERENCE TO RELATED APPLICATIONS

This application is a continuation of International Application No. PCT/CN2012/080569, filed on Aug. 24, 2012, which claims priority to Chinese Patent Application No. 201110459872.0, filed on Dec. 31, 2011 and Chinese Patent Application No. 201210045928.2, filed on Feb. 27, 2012, all of which are hereby incorporated by reference in their entireties.

TECHNICAL FIELD

Embodiments of the present invention relate to network security technologies, and in particular, to a data detecting method and apparatus for a firewall.

BACKGROUND

With rapid development and wide application of computers and network technologies, modern information technologies provide a tremendous impetus to civilization and progress of human beings. However, an information network has a number of security vulnerabilities due to its openness. With emergence of numerous hacker attacks, worm viruses, and malicious code, risks confronted by the information network are multiplying. To implement defense, a firewall device is generally deployed in the network. To adapt to an ever-increasing data transmission rate, a fast forwarder and a detecting processor are generally included in the firewall device of the prior art. The fast forwarder sends received application data to the detecting processor for threat detection, and then the fast forwarder quickly forwards the application data that has passed the detection performed by the detecting processor to implement detection on the application data.

The technical solution described above has at least the following problem in a practical application: because the fast forwarder needs to send all received application data to the detecting processing device for detection, when a large amount of application data is received, massive application data is detected by the detecting processing device which has a limited processing capability. This leads to a poor detection effect.

SUMMARY

Embodiments of the present invention provide a data detecting method and apparatus for a firewall to improve an effect of detection on application data by the firewall.

An embodiment of the present invention provides a data detecting method for a firewall, including: receiving application data; obtaining application information in the received application data, and determining an application protocol type corresponding to the application data according to the application information and an application identifying table, where the application identifying table includes a correspondence between the application information and the application protocol type, and the application information includes a destination Internet Protocol (IP) address, a destination port, and a transmission protocol type that correspond to the application data; querying a configuration item for threat detection according to the application protocol type to determine whether the application data requires threat detection, where the configuration item for threat detection includes an application protocol type that requires threat detection and/or an application protocol type that does not require threat detection; and forwarding the application data if the application data does not require threat detection.

An embodiment of the present invention provides a data detecting apparatus for a firewall, including a fast forwarder; where the fast forwarder includes: a receiving module configured to receive application data; an application identifying module configured to obtain application information in the application data received by the receiving module, and determine an application protocol type corresponding to the application data according to the application information and an application identifying table, where the application identifying table includes a correspondence between the application information and the application protocol type, and the application information includes a destination IP address, a destination port, and a transmission protocol type that correspond to the application data; a determining module configured to query a configuration item for threat detection according to the application protocol type determined by the application identifying module to determine whether the application data requires threat detection, where the configuration item for threat detection includes an application protocol type that requires threat detection and/or an application protocol type that does not require threat detection; and a forwarding module configured to forward the application data when the determining module determines that the application data does not require threat detection.

It can be learned from the foregoing technical solutions that, application data is received, application information in the received application data is obtained, an application protocol type corresponding to the application data is determined according to the application information and an application identifying table, a configuration item for threat detection is queried according to the application protocol type to determine whether the application data requires threat detection, and if the application data does not require threat detection, the application data is forwarded. The data detecting method and apparatus provided by the embodiments of the present invention avoid a problem that performance of a firewall is degraded because all application data is sent to a detecting processor for detection, thereby improving an effect of detection on the application data by the firewall.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by persons of ordinary skill in the art based on the embodiments of the present invention without creative efforts shall fall within the protection scope of the present invention.

Figure 1:
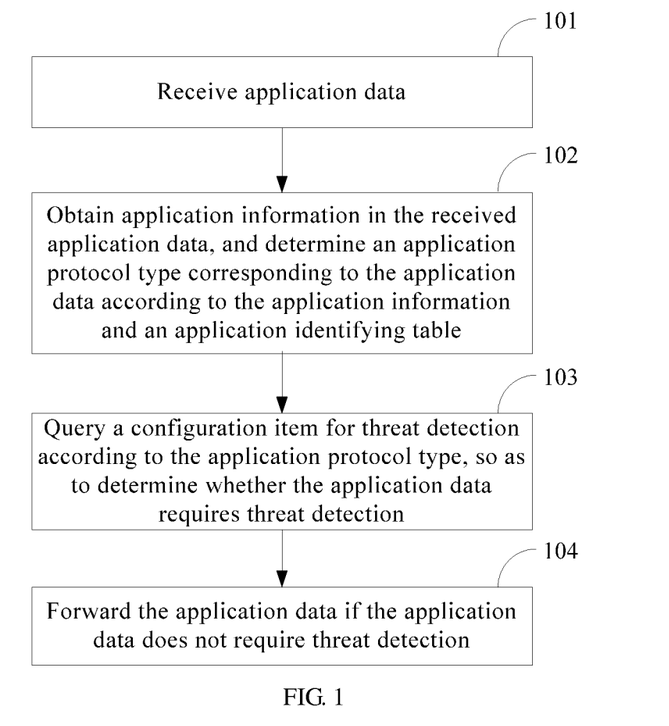
FIG. 1 is a flowchart of a data detecting method for a firewall according to an embodiment of the present invention.

FIG. 1 is a flowchart of a data detecting method for a firewall according to an embodiment of the present invention. As shown in FIG. 1, the data detecting method for a firewall provided by this embodiment may be specifically applied to detection on application data by the firewall, and the firewall may be disposed in a gateway. The data detecting method for a firewall provided by this embodiment may be specifically executed by a data detecting apparatus of the firewall, and the data detecting apparatus of the firewall may be disposed in the firewall and may be implemented by software and/or hardware.

Specifically, a fast forwarder and a detecting processor may be disposed in the firewall. The fast forwarder is a high-speed device that can achieve forwarding of application data, and may be implemented by a field programmable gate array (FPGA) or by an application specific integrated circuit (ASIC). An implementation manner of the fast forwarder may be specifically set according to an actual requirement for application data forwarding, and it is not limited to this embodiment so long as fast forwarding of application data may be achieved.

By using operations of the fast forwarder as an example, the data detecting method for a firewall provided by this embodiment is described in detail as follows.

The procedure of the method includes the following steps:

Step 101. Receive application data.

In this step, a terminal generally accesses the Internet by using a gateway and exchanges data with network devices such as a server in the network. The application data received by the fast forwarder may specifically be application data generated during a process of data exchange between network devices in the network.

Step 102. Obtain application information in the received application data, and determine an application protocol type corresponding to the application data according to the application information and an application identifying table.

The fast forwarder parses the received application data, obtains a destination IP address, a destination port, and a transmission protocol type that correspond to the application data, and generates the application information according to the destination IP address, the destination port, and the transmission protocol type, where the application identifying table includes a correspondence between the application information and the application protocol type, and the application information includes the destination IP address, the destination port, and the transmission protocol type that correspond to the application data.

The application information corresponding to the application data is specifically used to indicate information such as a destination host address and an application type of the application data. An application protocol corresponding to the application data may be determined according to the application protocol type corresponding to the application information. Multiple application protocol types, that is, service types, for example, a Hyper Text Transfer Protocol (HTTP) service, a Simple Mail Transfer Protocol (SMTP) service, an instant messaging service, and an enterprise private service, may be included. The application information corresponding to the application data may specifically include the destination IP address, the destination port, and the transmission protocol type, and these three types of information form a piece of triplet information. The application information may further include other information that can be used to categorize the application data, but is not limited to what described in this embodiment. The application identifying table includes a correspondence between the application information and the application protocol type, for example: a piece of triplet application information in which the destination IP address is 202.22.1.33, the destination port is 80, and the transmission protocol type is Transmission Control Protocol (TCP) corresponds to the HTTP service.

Step 103. Query a configuration item for threat detection according to the application protocol type to determine whether the application data requires threat detection.

The configuration item for threat detection includes an application protocol type that requires threat detection and/or an application protocol type that does not require threat detection. Specifically, the configuration item for threat detection may be obtained from the detecting processor, may be generated according to a detection result of threat detection performed by the detecting processor on the application data, or may be dynamically updated. Because potentials of carrying threats are different for application data of different application types, it is possible to set, according to the application protocol type, whether the application data requires threat detection. For example, a network segment may be preset so that all application data of the destination host address within the network segment requires threat detection. Then, whether the application data requires threat detection may be determined according to the destination host address of the application data, and whether the application data requires threat detection may also be determined according to the application type of the application data.

During a process of detection on application data by the detecting processor, if a result of detection on application data having the same application information, that is, having a same application type generally indicates that no threat exists, it may be considered that the application data corresponding to the application type does not tend to carry a threat, and may not require threat detection. If a result of detection on application data of a same application type generally indicates that a threat exists, it may be considered that the application data corresponding to the application type tends to carry a threat, and requires threat detection. By querying the configuration item for threat detection according to the application type, whether the application data requires detection may be determined. For example, application data generated in the HTTP service tends to carry a threat and requires threat detection; application data generated in the enterprise private service does not tend to carry a threat and does not require threat detection.

Specifically, the configuration item for threat detection may further store the correspondence between the application information and the application type, so that the application type of the application information may be determined by querying the configuration item for threat detection.

By setting the configuration item for threat detection, whether application data of different application types requires threat detection may be managed, and the fast forwarder may learn, by simply querying the configuration item for threat detection, whether the application data requires threat detection. This is simple to achieve and has high execution efficiency.

Step 104. Forward the application data if the application data does not require threat detection.

If the fast forwarder learns that the application data does not require threat detection, the application data is forwarded directly.

According to the data detecting method for a firewall provided by this embodiment, application data is received, application information in the received application data is obtained, an application protocol type corresponding to the application data is determined according to the application information and an application identifying table, a configuration item for threat detection is queried according to the application protocol type to determine whether the application data requires threat detection, and if the application data does not require threat detection, the application data is forwarded. This avoids a problem that performance of a firewall is degraded because all application data is sent to a detecting processor for detection, thereby improving an effect of detection on the application data by the firewall.

Figure 2:
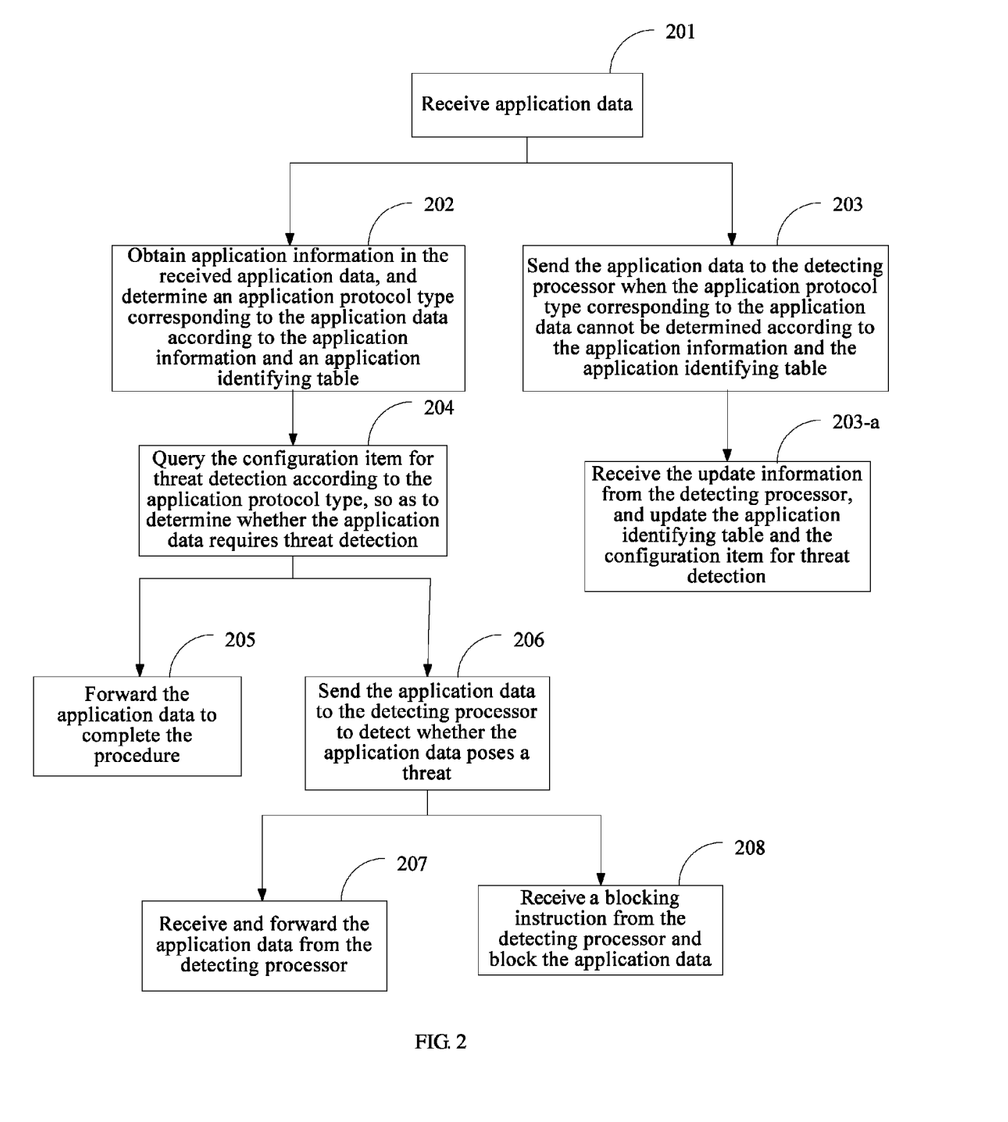
FIG. 2 is a flowchart of another data detecting method for a firewall according to an embodiment of the present invention.

FIG. 2 is a flowchart of another data detecting method for a firewall according to the embodiment of the present invention. As shown in FIG. 2, by using a fast forwarder as an example, the method may specifically include the following steps:

Step 201. Receive application data.

Step 202. Obtain application information in the received application data, and determine an application protocol type corresponding to the application data according to the application information and an application identifying table.

Step 203. Send the application data to the detecting processor when the application protocol type corresponding to the application data cannot be determined according to the application information and the application identifying table.

In this step, the detecting processor needs to identify a protocol type of the application data and determine whether the application data requires threat detection. When the application data requires threat detection, step 206 is performed; when the application data does not require threat detection, step 205 is performed.

Meanwhile, in this step, the detecting processor further needs to generate update information according to the newly identified application protocol type and/or a result of threat detection, and send the update information to the fast forwarder to update the local application identifying table and/or a configuration item for threat detection of the fast forwarder.

For step 203, the fast forwarder needs to perform:

Step 203-a: Receive the update information from the detecting processor, and update the application identifying table and the configuration item for threat detection.

The update information is generated according to a result of application protocol identifying and/or threat detection performed by the detecting processor on the application data, and the update information includes the application protocol type corresponding to the application data and information about whether the application data requires threat detection.

Step 204. Query the configuration item for threat detection according to the application protocol type to determine whether the application data requires threat detection. When the application data does not require threat detection, step 205 is performed; when the application data requires threat detection, step 206 is performed.

Step 205. Forward the application data to complete the procedure.

Step 206. Send the application data to the detecting processor to detect whether the application data poses a threat. When it is detected that the application data poses no threat, step 207 is performed; when it is detected that the application data poses a threat, step 208 is performed.

In this step, the detecting, by the detecting processor, the received application data includes at least one of the following: performing, by the detecting processor, intrusion prevention system (IPS) detection on the received application data; performing, by the detecting processor, anti-virus (AV) detection on the received application data; and performing, by the detecting processor, distributed denial of service (DDoS) detection on the received application data.

Step 207. Receive and forward the application data from the detecting processor.

Step 208. Receive a blocking instruction from the detecting processor and block the application data.

Figure 3:
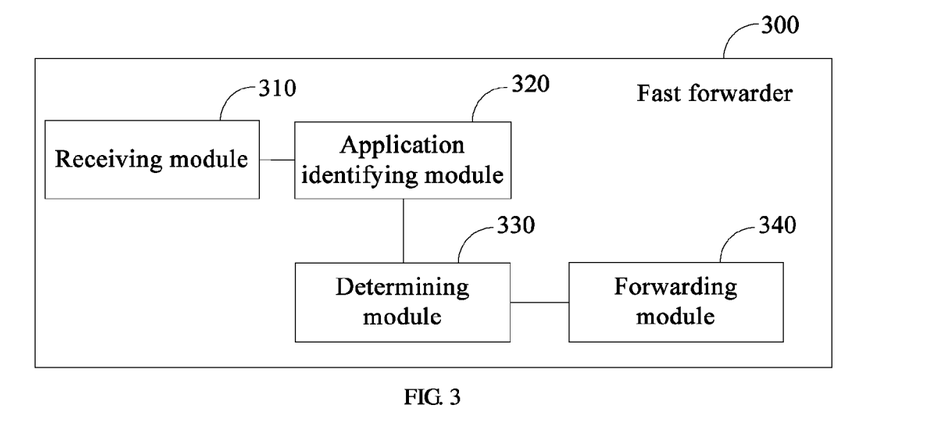
FIG. 3 is a schematic structural diagram of a data detecting apparatus for a firewall according to an embodiment of the present invention.

FIG. 3 is a schematic structural diagram of a data detecting apparatus for a firewall according to the embodiment of the present invention. As shown in FIG. 3, the data detecting apparatus for a firewall provided by this embodiment may specifically implement steps of the data detecting method for a firewall provided by any embodiment of the present invention, and details are not described herein again.

The data detecting apparatus for a firewall provided by this embodiment specifically includes a fast forwarder 300. The faster forwarder 300 includes: a receiving module 310 configured to receive application data; an application identifying module 320 configured to obtain application information in the application data received by the receiving module 310, and determine an application protocol type corresponding to the application data according to the application information and an application identifying table, where the application identifying table includes a correspondence between the application information and the application protocol type, and the application information includes a destination IP address, a destination port, and a transmission protocol type that correspond to the application data; a determining module 330 configured to query a configuration item for threat detection according to the application protocol type determined by the application identifying module 320 to determine whether the application data requires threat detection, where the configuration item for threat detection includes an application protocol type that requires threat detection and/or an application protocol type that does not require threat detection; and a forwarding module 340 configured to forward the application data if the determining module 330 determines that the application data does not require threat detection.

According to the data detecting apparatus for a firewall provided by this embodiment, the receiving module receives application data, the application identifying module obtains application information in the received application data and determines an application protocol type corresponding to the application data according to the application information and an application identifying table, and the determining module queries a configuration item for threat detection according to the application protocol type to determine whether the application data requires threat detection, and if the application data does not require threat detection, the forwarding module directly forwards the application data. The data detecting method and apparatus provided by the embodiments of the present invention avoid a problem that performance of a firewall is degraded because all application data is sent to a detecting processor for detection, thereby improving an effect of detection on the application data by the firewall.

Figure 4:
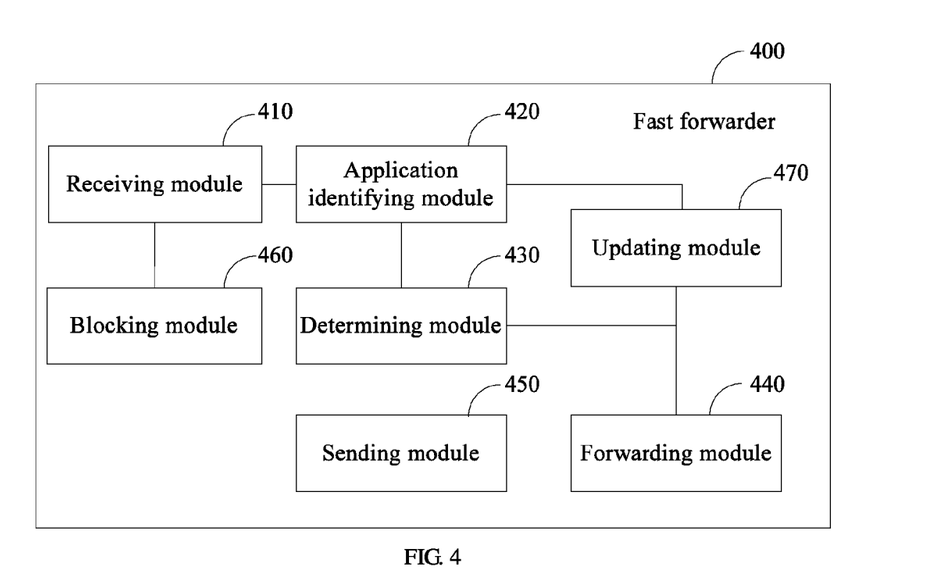
FIG. 4 is a schematic structural diagram of another data detecting apparatus for a firewall according to an embodiment of the present invention.

FIG. 4 is a schematic structural diagram of another data detecting apparatus for a firewall according to the embodiment of the present invention. As shown in FIG. 4, in this embodiment, the fast forwarder 400, in addition to including a receiving module 410, an application identifying module 420, a determining module 430, and a forwarding module 440, further includes: a sending module 450 configured to send the application data to a detecting processor when the determining module 430 determines that the application data requires threat detection; the forwarding module 440 is further configured to receive and forward the application data from the detecting processor when the detecting processor detects that the application data poses no threat; the fast forwarder further includes a blocking module 460 configured to receive a blocking instruction from the detecting processor and block the application data when the detecting processor detects that the application data poses a threat.

The sending module 450 is further configured to send the application data to the detecting processor when an application protocol type corresponding to the application data cannot be determined by the application identifying module 420.

The fast forwarder 400 further includes an updating module 470 configured to receive update information from the detecting processor, and update the application identifying table and the configuration item for threat detection, where the update information is generated according to a result of application protocol identifying and/or threat detection performed by the detecting processor on the application data, and the update information includes the application protocol type corresponding to the application data and information about whether the application data requires threat detection.

According to the data detecting method and apparatus for a firewall provided by the embodiments of the present invention, it may be implemented that a fast forwarder determines whether received application data requires threat detection, and directly forwards application data that does not require threat detection. This avoids a problem that performance of a firewall is degraded because all application data is sent to a detecting processor for detection, thereby improving an effect of detection on the application data by the firewall, and significantly improving performance of the firewall equipment. Furthermore, by setting an application identifying table, a process of identifying the application data may be implemented more easily, and by updating the application identifying table according to an actual detecting result, the application identifying table can be adapted to continuous development of network applications and the number of application protocol types that can be identified is increased.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A data detecting method for a firewall device connected with a network to identify a security threat in the data, wherein the method is implemented by a fast forwarder in the firewall device, and wherein the method comprises:
    receiving application data, wherein the application data is generated during a process of data exchange between at least two network devices in the network;
    obtaining application information in the received application data;
    determining an application protocol type corresponding to the application data according to the application information and an application identifying table when the application protocol type can be determined according to the application information and the application identifying table, wherein the application identifying table comprises a correspondence between the application information and the application protocol type, and wherein the application information comprises a destination Internet Protocol (IP) address, a destination port, and a transmission protocol type that correspond to the application data;
    querying a configuration item for threat detection according to the application protocol type to determine whether the application data requires threat detection, wherein the configuration item for threat detection is one of an application protocol type that requires threat detection and an application protocol type that does not require threat detection;
    forwarding the application data directly to a network device next to the firewall device when the application data does not require threat detection;
    sending the application data to a detecting processor in the firewall device only when it is determined that the application data requires threat detection;
    receiving update information from the detecting processor, wherein the update information is generated according to a result of application protocol identifying and/or threat detection performed by the detecting processor on the application data, and wherein the update information comprises the application protocol type corresponding to the application data and information about whether the application data requires threat detection;
    updating the application identifying table and the configuration item for threat detection with the update information; and
    forwarding the application data from the detecting processor to the network device next to the firewall device when the detecting processor detects that the application data poses no threat.

2. The data detecting method for the firewall device according to claim 1, wherein the configuration item indicates whether threat detection is required based solely on the application protocol type.

3. The data detecting method for a firewall according to claim 1, further comprising sending the application data to the detecting processor when the application protocol type corresponding to the application data cannot be determined according to the application information and the application identifying table.

4. The data detecting method for a firewall according to claim 1, wherein application data generated in a Hyper Text Transfer Protocol (HTTP) service has a high potential for threat and requires threat detection, and wherein application data generated in an enterprise private service has a low potential for threat and does not require threat detection.

5. The data detecting method for a firewall according to claim 1, wherein the application protocol type is one of a Hyper Text Transfer Protocol (HTTP) service, a Simple Mail Transfer Protocol (SMTP) service, an instant messaging service, and an enterprise private service.

6. The data detecting method for a firewall according to claim 1, further comprising detecting whether the application data poses a threat by performing at least one of intrusion prevention system detection, anti-virus detection, and distributed denial of service attack detection.

7. The data detecting method for the firewall device according to claim 2, wherein the method further comprises receiving a blocking instruction from the detecting processor and blocking the application data when the detecting processor detects that the application data poses a threat.

8. A data detecting apparatus, comprising:
a firewall device comprising a fast forwarder configured to:
receive a plurality of network traffic packets, wherein each network traffic packet comprises application information, wherein the application information comprises a destination Internet Protocol (IP) address, a destination port, and a transmission protocol type;
determine an application protocol type according to the application information and an application identifying table when the application protocol type can determined according to the application information and the application identifying table, wherein the application identifying table comprises a correspondence between the application information and the application protocol type;
query a configuration item for threat detection according to the application protocol type to determine whether each of the traffic network packets requires threat detection, wherein the configuration item for threat detection is one of an application protocol type that requires threat detection and an application protocol type that does not require threat detection;
determine that a first subset of the network traffic packets require threat detection because the first subset of the network traffic packets comprise a first application information associated with the application protocol type that requires threat detection;
sending the first subset of the network traffic packets to a threat detection processor in the firewall device only when the first subset of network traffic packets require threat detection;
determine that a second subset of the network traffic packets do not require threat detection because the second subset of the network traffic packets comprise a second application information associated with the application protocol type that does not require threat detection; and
forward the second subset of network traffic packets to a network device downstream of the firewall device without performing a complete threat detection analysis on the application information of the second subset of network traffic packets.

9. The data detecting apparatus according to claim 8, wherein the
threat detection processor in the firewall device is configured to perform the complete threat detection analysis on the application information in the first subset of network traffic packets, and
wherein the fast forwarder is further configured to:
receive the first subset of network traffic packets from the detecting processor after it has been determined that the first subset of network traffic packets do not pose any threats; and
forward the first subset of network packets to the network device downstream of the firewall device.

10. The data detecting apparatus according to claim 8, wherein the fast forwarder is further configured to drop the first subset of network traffic packets without forwarding the first subset of network traffic packets to the network device downstream of the firewall device when the threat detection processor detects that the first subset of network traffic packets pose a threat.

11. The data detecting apparatus according to claim 8, wherein the fast forwarder is further configured to:
receive update information from the threat detection processor, wherein the update information identifies that the application protocol type does not require threat detection; and
update the application identifying table to indicate that the application protocol type does not require threat detection;
receive subsequent network traffic packets that contain the first application information associated with the application protocol type after updating the application identifying table; and
forward the subsequent network packets to the network device downstream of the firewall device without performing the complete threat detection analysis on the subsequent network traffic packets.

12. The data detecting apparatus according to claim 8, wherein the potentially threatening application protocol type is Hyper Text Transfer Protocol (HTTP), and wherein the non-threatening application protocol type is an enterprise private service.

13. The data detecting apparatus according to claim 8, wherein the complete threat detection analysis comprises performing at least one of intrusion prevention system detection, anti-virus detection, and distributed denial of service attack detection.

14. A non-transitory computer readable storage medium storing a program of instructions executable by a processor, wherein the program of instructions causes the processor to:
receive a plurality of network traffic packets, wherein each network traffic packet comprises application information, and wherein the application information comprises a destination Internet Protocol (IP) address, a destination port, and a transmission protocol type that correspond to the application information;
perform a partial threat analysis on each network traffic packet, wherein the partial threat analysis analyzes only an application protocol type associated with the application information in each network traffic packet and, and wherein the partial threat analysis comprises:
determining an application protocol type according to the application information and an application identifying table when the application protocol type can be determined according to the application information and the application identifying table, wherein the application identifying table comprises a correspondence between the application information and the application protocol type;
querying a configuration item for threat detection according to the application protocol type to determine whether each of the traffic network packets requires threat detection, wherein the configuration item for threat detection is one of an application protocol type that requires threat detection and an application protocol type that does not require threat detection;

determining that a first subset of the network traffic packets require threat detection because the first subset of the network traffic packets comprise a first application information associated with the application protocol type that requires threat detection; and determining that a second subset of the network traffic packets do not require threat detection because the second subset of the network traffic packets comprise a second application information associated with the application protocol type that does not require threat detection;

send the first subset of network traffic packets to a threat detection processor in a firewall device only when the first subset of network traffic packets require threat detection; and forward the second subset of network traffic packets to a network device downstream of the processor without performing a complete threat detection analysis on the second subset of network traffic packets.

15. The non-transitory computer readable storage medium according to claim 14, wherein the program of instructions further causes the processor to:

receive the first subset of network traffic packets from the threat detection processor after it has been determined that the first subset of network traffic packets do not pose any threats; and forward the first subset of network packets to a network device downstream of the firewall device after it has been determined that the first subset of network traffic packets do not pose any threats.

16. The non-transitory computer readable storage medium according to claim 14, wherein the program of instructions further causes the processor to drop the first subset of network traffic packets without forwarding the first subset of network traffic packets to a network device downstream of the firewall device when the complete threat detection analysis determines that the first subset of network traffic packets pose a threat.

17. The non-transitory computer readable storage medium according to claim 14, wherein the application protocol type is Hyper Text Transfer Protocol (HTTP), and wherein the second application protocol type is an enterprise private service.

18. The non-transitory computer readable storage medium according to claim 14, wherein the complete threat detection analysis comprises performing intrusion prevention system detection, anti-virus detection, and distributed denial of service attack detection.

19. The non-transitory computer readable storage medium according to claim 15, wherein the program of instructions further causes the processor to:

receive update information, wherein the update information identifies that the application protocol type does not require threat detection; and receive subsequent network traffic packets that contain the first application information associated with the application protocol type after receiving the update information; and forward the subsequent network traffic packets to the network device downstream of the firewall device without performing the complete threat detection analysis on the subsequent network traffic packets.

* * * * *